United States Patent
D'Amato et al.

(10) Patent No.: US 8,635,285 B2
(45) Date of Patent: Jan. 21, 2014

(54) EMAIL CATEGORIZATION METHODS, CODING, AND TOOLS

(76) Inventors: Paul D'Amato, Grand Rapids, MI (US); Patrick Zeller, Hawthorn Woods, IL (US)

(*) Notice: Subject to any disclaimer, the term of this patent is extended or adjusted under 35 U.S.C. 154(b) by 1268 days.

(21) Appl. No.: 11/963,790

(22) Filed: Dec. 22, 2007

(65) Prior Publication Data
US 2009/0164588 A1    Jun. 25, 2009

(51) Int. Cl.
*G06F 15/16* (2006.01)
*G06F 17/00* (2006.01)
*G06F 3/048* (2013.01)

(52) U.S. Cl.
USPC ........... 709/206; 709/207; 715/204; 715/752; 715/763

(58) Field of Classification Search
USPC .................. 709/206–207; 715/204, 752, 763
See application file for complete search history.

(56) References Cited

U.S. PATENT DOCUMENTS

| | | | | |
|---|---|---|---|---|
| 7,237,009 B1* | 6/2007 | Fung et al. | ..................... | 709/206 |
| 2002/0059418 A1* | 5/2002 | Bird et al. | ...................... | 709/224 |
| 2003/0023695 A1* | 1/2003 | Kobata et al. | ................. | 709/206 |
| 2005/0120118 A1 | 6/2005 | Thibadeau | | |
| 2005/0144245 A1 | 6/2005 | Lowe | | |
| 2005/0267944 A1 | 12/2005 | Little, II | | |
| 2006/0085504 A1 | 4/2006 | Yang et al. | | |
| 2006/0095521 A1 | 5/2006 | Patinkin | | |
| 2006/0168040 A1 | 7/2006 | Kushmerick et al. | | |
| 2006/0184479 A1 | 8/2006 | Levine | | |
| 2006/0195533 A1 | 8/2006 | Isozaki et al. | | |
| 2006/0195534 A1 | 8/2006 | Isozaki et al. | | |
| 2006/0200523 A1 | 9/2006 | Tokuda et al. | | |
| 2007/0005702 A1 | 1/2007 | Tokuda et al. | | |
| 2008/0091785 A1* | 4/2008 | Pulfer et al. | ................... | 709/206 |
| 2008/0256188 A1* | 10/2008 | Massand | ....................... | 709/206 |

* cited by examiner

*Primary Examiner* — Joseph Avellino
*Assistant Examiner* — Aftab Nasir Khan
(74) *Attorney, Agent, or Firm* — Brooks Kushman P.C.

(57) ABSTRACT

An electronic mail management system is operable to receive electronic mail message components from a user. Prior to sending of the email message, a plurality of predetermined categories for classifying the electronic message are presented to the user. The email system receives a user selection from the predetermined categories. A determination is made as to whether or not the email recipient is a member of a predetermined class of recipients. The electronic mail is then sent to the recipient. The user selection is embedded within the email message if the recipient is a member of the predetermined class of recipients. Finally, the email is stored in a manner dependent upon the user selection. Similarly, the email management server may also be operable to categorize received email messages. Further, email messages may be selected or programmed to automatically be deleted upon certain events.

21 Claims, 9 Drawing Sheets

EMAIL CATEGORIZATION METHODS, CODING, AND TOOLS

BACKGROUND OF THE INVENTION

1. Field of the Invention

In at least one aspect, the present invention relates to the method for categorizing electronic mail message so that business-related messages may be distinguished from non-business related messages and also so that business-related messages may be further categorized into pre-determined and user created categories.

2. Background Art

One of the leading problems facing companies in complying with discovery requirements associated with civil litigation is the large volume of email messages. Although it is estimated that over 50% of email messages sent and received at work are non-business related, typically personal in nature, it is not feasible to completely eliminate such activity in an effort to simplify and improve information management. Consequently, the management of email messages is not only time consuming, it also places a heavy financial and technical burden upon company resources.

In addition, recent amendments to the Federal Rules of Civil Procedure require businesses to establish and follow policies for the preservation and destruction of email and other electronic information. Therefore, electronic discovery (e-discovery) has become an integral part of the civil litigation process, fostered by an awareness among legal experts that a large proportion of evidence is digital in nature. In conducting electronic discovery, problems often arise with respect to the vast quantities of electronic mail that must be reviewed, whether for a party's document production in litigation against another party or for any other relevant legal purpose. Therefore, a party's ability to manage information in these scenarios often depends on how readily it can capture, sort, review, and produce relevant email messages.

The gathering of partial or erroneous data can have profound implications on an electronic discovery process. Typically, metadata, or information associated with a given file, is stored on the file's host device. Metadata can include information, such as a file's creation date, author, or storage path. Some current methods of e-discovery limit search processes to a file's metadata and, in turn, miss information that could be crucial to a discovery process. Often, the relevant content is not stored in the metadata, but rather in the actual file data. Currently, email management typically involves the capture, indexing and archiving of all inbound, outbound and internal compliance-stipulated metadata that has been categorized according to a large variety of criteria. Consequently, such vast amounts of data can be difficult to manage when a company must produce content in response to a discovery request.

In addition to being expensive, obsolete, and often incomplete, the current methods of electronic discovery can be highly disruptive to business operations. Many email management tools require physical access for analysis by a consultant or expensive software program. The overhead cost of such programs and services, along with the business disruption in such circumstances, is often immense and unwarranted, particularly in situations involving large corporate-wide servers or tape drives. Additionally, these types of intrusive investigations into email use, and the implementation of email security measures, can result in a significant loss of workplace morale among employees.

Accordingly, there exists a need for improved methods of filter email messages in a manner consistent with the legal requirements placed on companies for managing such email messages.

SUMMARY OF THE INVENTION

The present invention solves one or more problems of the prior art by providing in at least one embodiment an electronic mail management system for categorizing electronic mail messages received by a user or sent by a user. The electronic mail management system is operable to receive electronic mail message components from the user. The electronic mail components characteristically identify at least one recipient to which an electronic mail message is to be sent. A plurality of predetermined categories for classifying the electronic message are presented to the user. These predetermined categories associated with a command that is operable by the user. The email system receives a first user selection from the predetermined categories. A determination is made as to whether or not the email recipient is a member of a predetermined class of recipients. The electronic mail is subsequently sent to the recipient. The first user selection is embedded within the email message if the recipient is a member of the predetermined class of recipients. Finally, the email is stored in a manner dependent upon the user selection.

In another embodiment of the present invention, the email management server is operable to categorize received email messages. In this embodiment, the email server receives a user selection to open a received email message. The user is presented with a plurality of predetermined categories for classifying the email message from which a selection is made. The email message is subsequently stored in a manner dependent upon the selected category.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
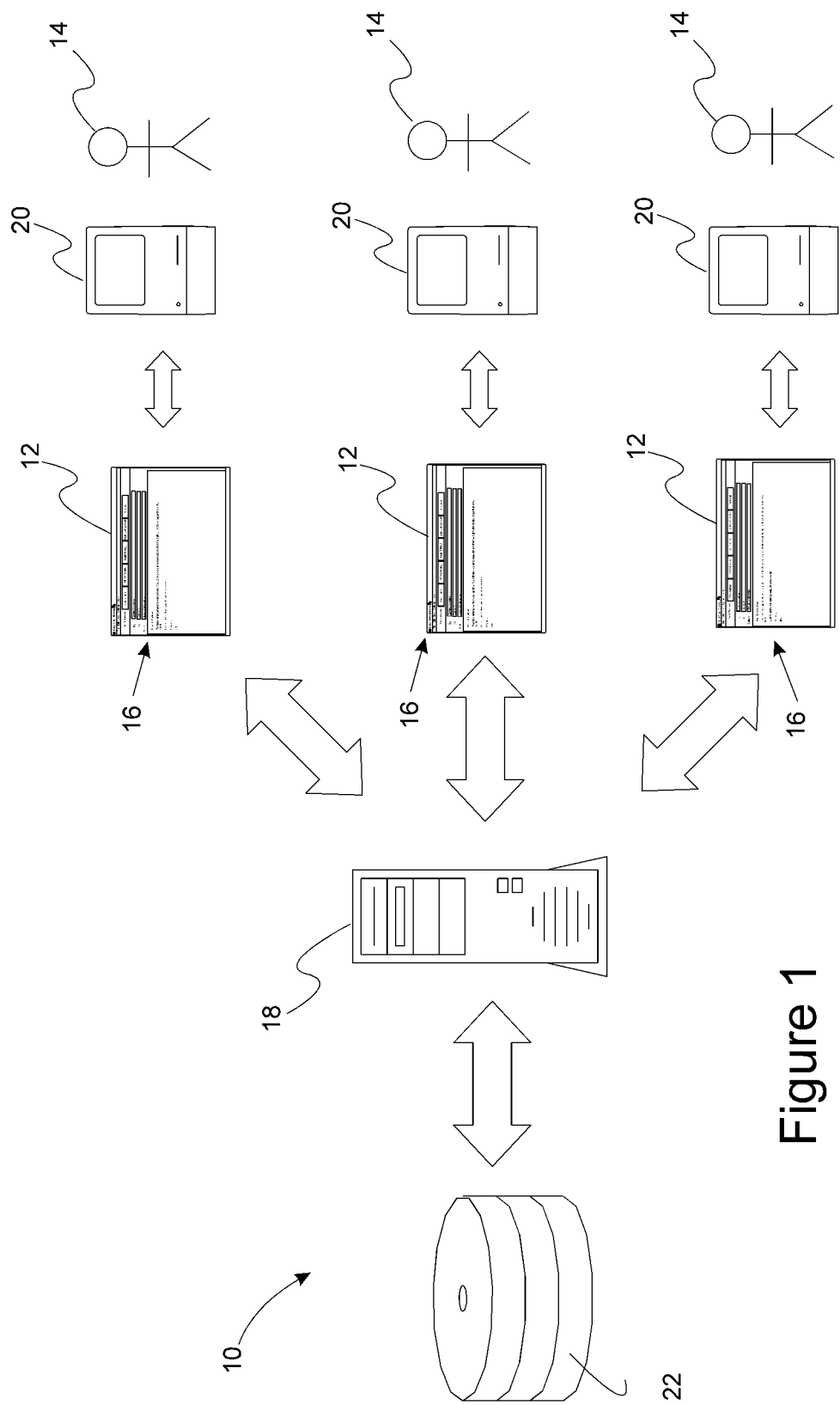
FIG. 1 is a schematic illustration of an electronic mail management system that implements a method of categorizing email messages.

With reference to FIG. 1, a schematic illustration of an electronic mail management system is provided. Electronic mail ("email") management system 10 of this embodiment is useful for categorizing electronic mail messages 12 received or sent by users 14. Email messages 12 include one or more email components 16. Email management system 10 typically includes server 18 interacting with user computers 20. Typically, this interaction will be over an intranet or the Internet. Computer 20 may be any device capable of accessing email. Examples of such devices include, but are not limited to, personal computers, servers, hand held devices, cell phone, and the like. Electronic mail system 10 stores email messages 12 on a storage medium 22. Storage medium 22 includes any type of medium that can be used to store digital electronic information. Examples of such media include, but are not limited to, hard drives, tape drives, optical drives, DVD media, CD media, and the like. Email management system 10 is operable to execute a method for categorizing email messages 12 set forth below.

Figure 2A:
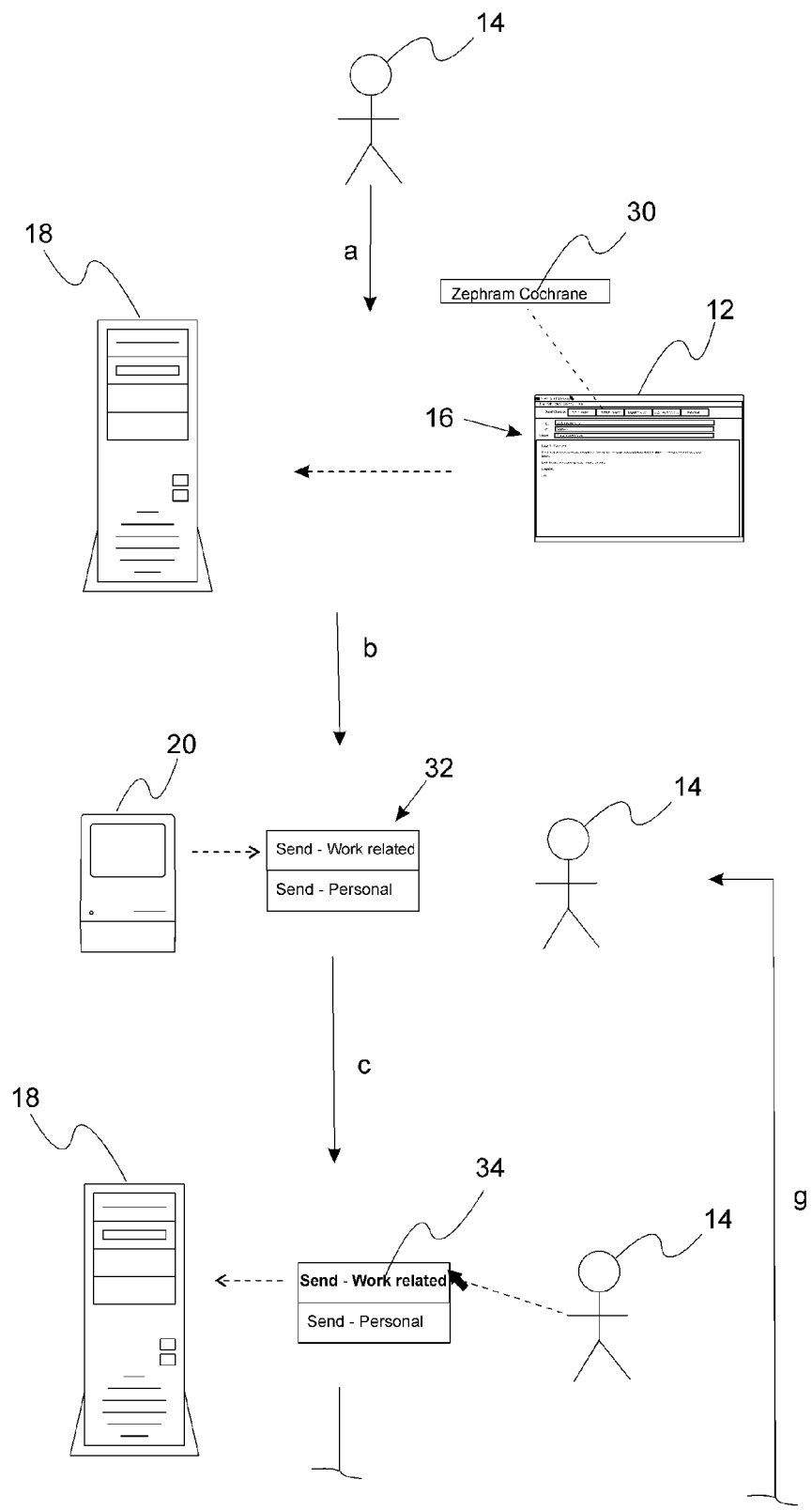
FIGS. 2A and 2B provide a flowchart depicting an embodiment of the method executed by the email management system of FIG. 1.
Figure 2B:
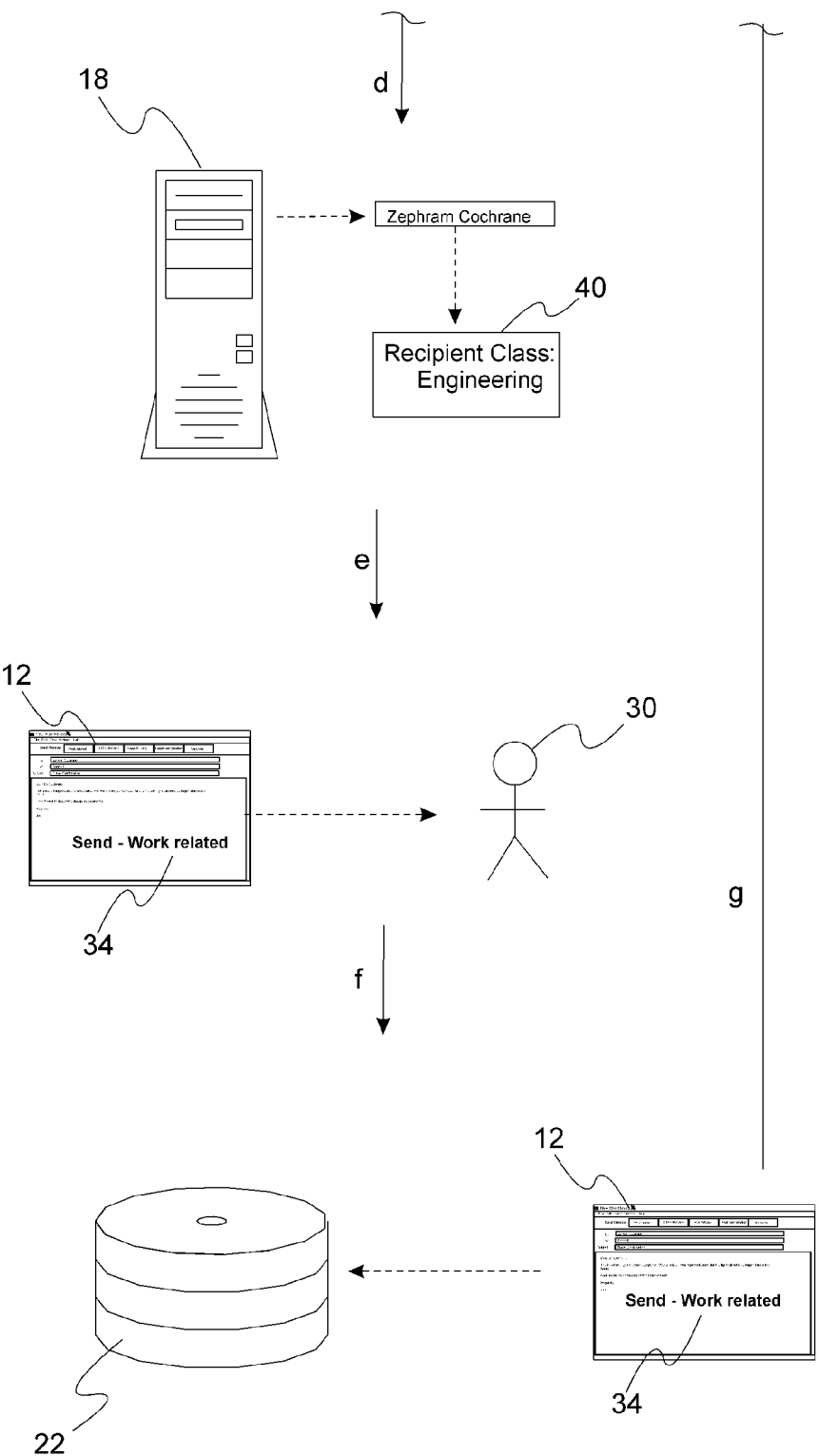

FIGS. 2A and 2B provide a flowchart depicting an embodiment of the method executed by email management system 10. In step a), email server 18 receives email components 16 from user 14. Email components 16 include identification of at least one recipient 30 as shown in step a). In step b), a plurality of predetermined categories 32 are presented to user 14 for classifying email message 12. Predetermined categories 32 are associated with a command that is operable by user 12. For example, predetermined categories 32 may be associated with a button object, a menu item, and the like. Such commands may be initiated to save a draft of an email message (e.g., "Save," "Save As", etc), send an email message, and the like. Variations linking selections the predetermined categories to command that save draft email messages allow such messages to be categorized. In a particularly useful variation as depicted in FIGS. 2A-2B, predetermined categories 32 are associated with a "Send" command that is operable by user 12. It should be appreciated that application to other commands are implemented analogously. In another refinement, user 12 operates a "Send" command and then is presented with a listing of the predetermined categories. In step c), first user selection 34 is received from predetermined categories 32. Next, a determination is made if recipient 30 is a member of predetermined class of recipients 40 (step d). In step e), email message 12 is sent to recipient 30 with first user selection 34 being embedded therein if recipient 30 is a member of predetermined class of recipients 40. Otherwise, the email may be sent without the categorization information. The limitation of step e) to sending the email with the categorization information only to authorized recipients is particularly useful so that information regarding the categorization of an email message is not inadvertently sent outside a company or to a person not authorized to receive such information. This feature is particularly useful in civil litigation to prevent attorney work product, attorney-client communication or confidential information from being disseminated. Email messages 12 are stored on storage medium 22 in a manner dependent upon the user selection is step f). In a variation, users are allowed to re-categorize sent email messages or saved draft email messages is step g).

Any number of methods or criteria may be used for storing email messages 12. For example, email messages 12 may be stored for a predetermined period of time that is related to the category into which an email is placed. Moreover, the categorization of emails in accordance with the present embodiment may be used in combination with searching technologies in order to find documents responsive to document requests, such as those occurring during civil litigation. In a further refinement, statistics regarding user compliance in making category selections as well as, statistics regarding the specific categories, are optionally assembled.

In another variation of the present invention, the categorization of email 12 triggers one or more rules controlling or limiting the functionality and/or the storage of email messages after they have been drafted, saved, sent, or received. Application of the functionality of this variation requires appropriate configuration of email management system 10. For example, certain categories of email messages may be prevented or limited in one or more of the following activities; sending, forwarding, replying to all, saving, deleting and the like. In a further refinement, email messages may be set to continually show up in the recipients' email list as a new message, or urgent message, even after it has been read. In another refinement, email messages may be set to automatically deleted after they have been read by the recipient, automatically be removed from the deleted folder, and removed from the recycle bin. In still another refinement, the sender may automatically get a copy of any message that was forwarded by the recipient. Each of these options related to email functionality can be limited or triggered by the identity of the recipient or sender or by the occurrence of a predetermined condition, such as the email being saved or deleted. These options may also be limited by the status of the sender or recipient (e.g., identity, position, division, and the like) and whether or not the message is being sent outside the company. For example, an attorney working for a company may draft an email message designated as "Attorney-Client Privilege." Such a designated email may be restricted from being sent outside of the company or forwarded or replied to in a "reply to all" manner. Such a message may be limited by allowing only replies to a member of the legal department or by preventing additional recipients to be added if the message is forwarded. The email message can even be configured to be automatically deleted after read. If an email message designated to have limited functionality is sent outside of the control of a company's email server, the receiving email server should be compliant with this functionality. In variation, email management server 10 tests to see if a receiving email server is compliant. If the receiving email server is not compliant, the email message may not be sent. If the email message is sent, the sender or a designated person or computer system may be informed of this event.

Figure 3:
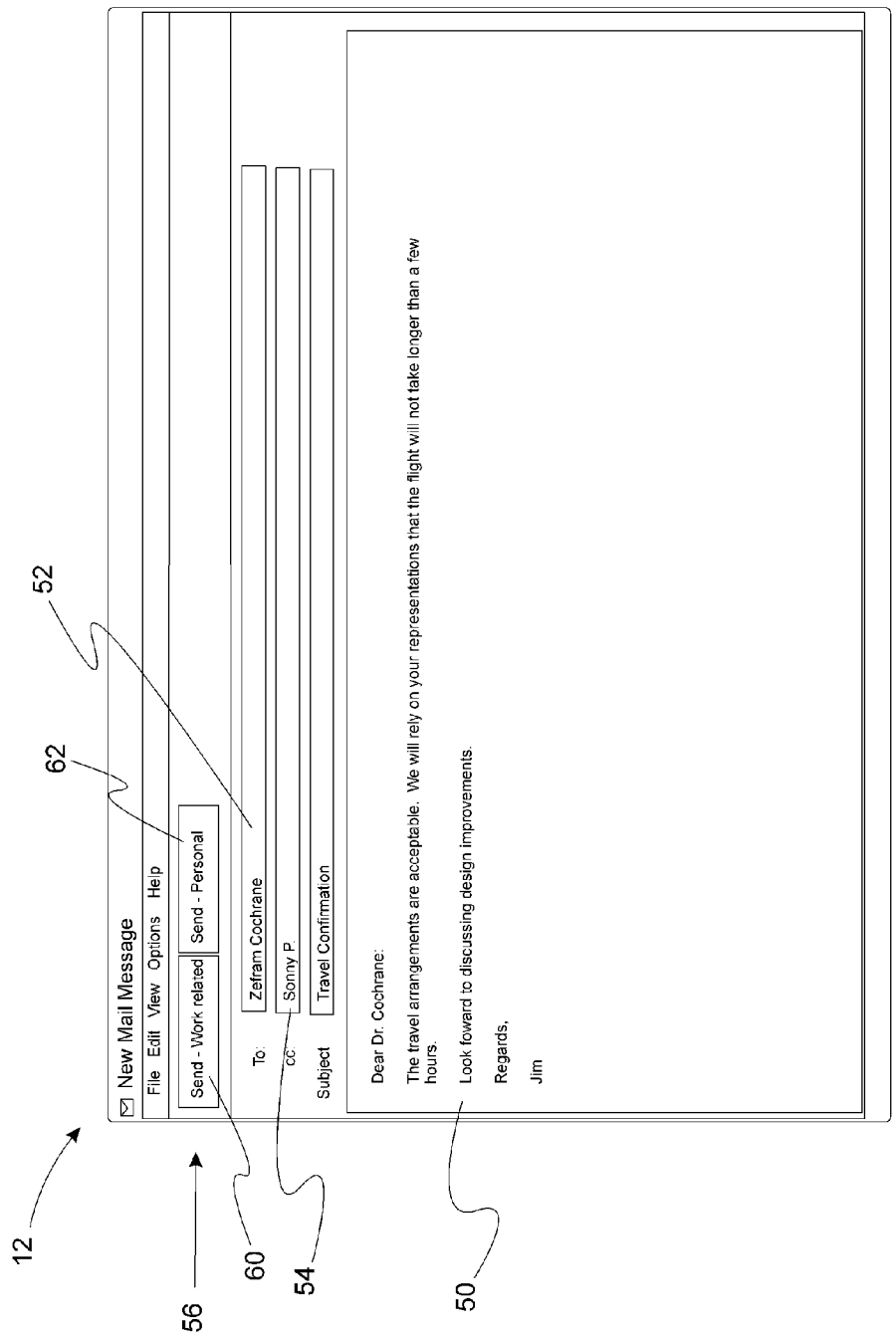
FIG. 3 is an illustration of an email message that can be categorized by an embodiment of an email system.

With reference to FIG. 3, an illustration of an email message that is able to be categorized by email system 10 is provided. Email message 12 is present to the user as a graphical user interface. Email messages 12 include a number of distinct components. For example, as depicted in FIG. 3, email messages 12 include email message body 50. Email messages 12 characteristically identify at least one recipient 52 to which an electronic mail message is to be sent. Additional email recipients 54 may also be identified in email messages 12. Email messages 12 include a plurality of predetermined categories for classifying the electronic message that are presented to users 14 as described in connection with the description of FIGS. 2A and 2B. In a variation, each category has an associated computer readable identifying code for computer implementation of activities associated with the user selection. In a further refinement, the predetermined categories are associated with a "Send" command that is operable by user 14. In the specific variation depicted in FIG. 4, a "Send" button is bifurcated into a "Send-Work related" button 60 and a "Send-Personal" button 62. In this example, user 12 allows send email messages to be categorized as personal or work-related. It should be appreciated that the send button can be divided into any number of send subsection or distinct send buttons each of which is associated with a categorization. Typically, the steps of the present invention will be repeated a plurality of times in the normal operation of email management system 10.

Figure 4:
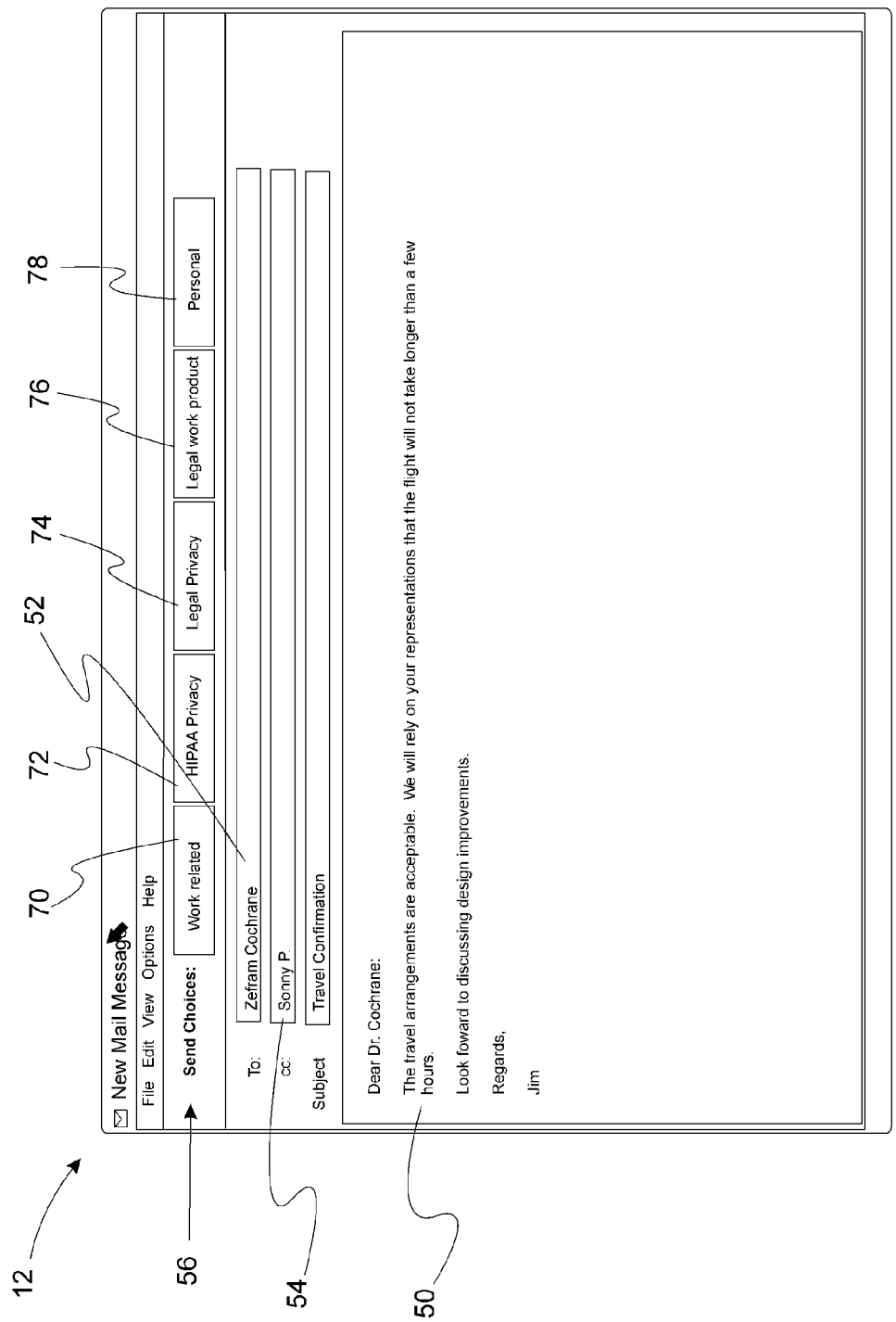
FIG. 4 is an illustration of an email message that is able to be categorized by the email management system of FIG. 1.

With reference to FIG. 4, an illustration of another variation of an email message that is able to be categorized by email system 10 is provided. In this variation email message 12, which is a graphical user interface, includes email message body 50. Again, email messages 12 characteristically identify at least one recipient 52 to which an electronic mail message is to be sent. Additional email recipients 54 may also be identified in email messages 12. Email messages 12 include a plurality of predetermined categories 56 for classifying the electronic message that are presented to users 14 as described in connection with the description of FIGS. 2A and 2B. In this variation, a "Send" button is divided into several buttons each send button associated with a different category. In the specific example of FIG. 4, "Work-related" send button 70, "HIPAA Privacy" send button 72, "Legal Privacy" send button 74, "Legal Work Product" button 76, and "Personal" send button 78 are depicted.

Figure 5:
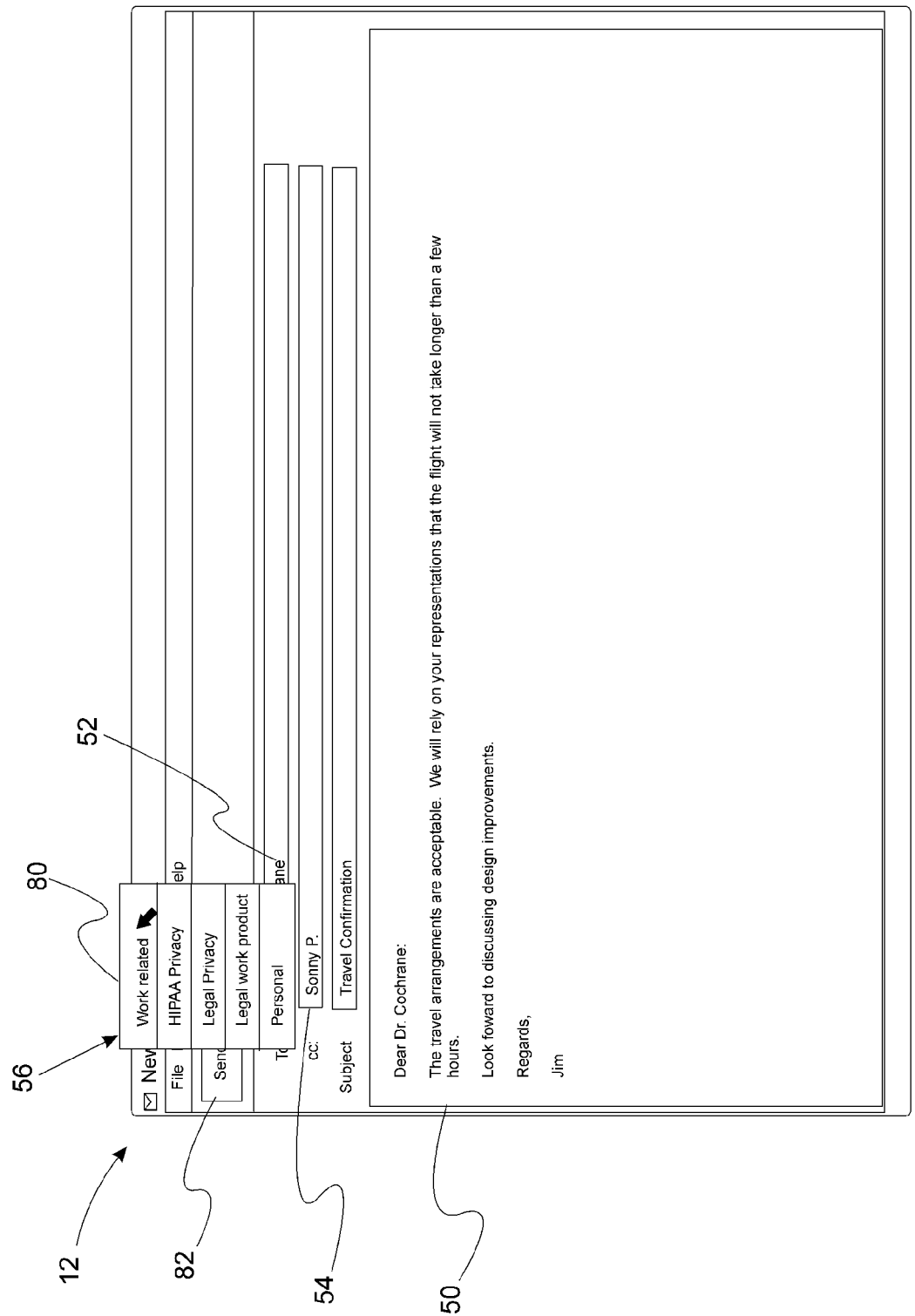
FIG. 5 is an illustration of an email message that is able to be categorized by the email management system of FIG. 1.

With reference to FIG. 5, a schematic of still another variation of an email message categorized by email system 10 is provided. In this variation, email message 12 includes email message body 50. Again, email messages 12 characteristically identify at least one recipient 52 to which an electronic mail message is to be sent. Additional email recipients 54 may also be identified in email messages 12. Email messages 12 include a plurality of predetermined categories 56 for classifying the electronic message that are presented to users 14 as described in connection with the description of FIGS. 2A and 2B. In this variation, pop-up menu 80 associated with "Send" button 82. In the specific example of FIG. 5, the popup menu presents "Work-related," "HIPAA Privacy," "Legal Privacy," "Legal Work Product" and "Personal" choices which may be selected by user 14 to categorize email message 12. It should also be appreciated that other construct such as a pull-down menu may also be used instead of or in combination with pop-up menu 80.

Figure 6A:
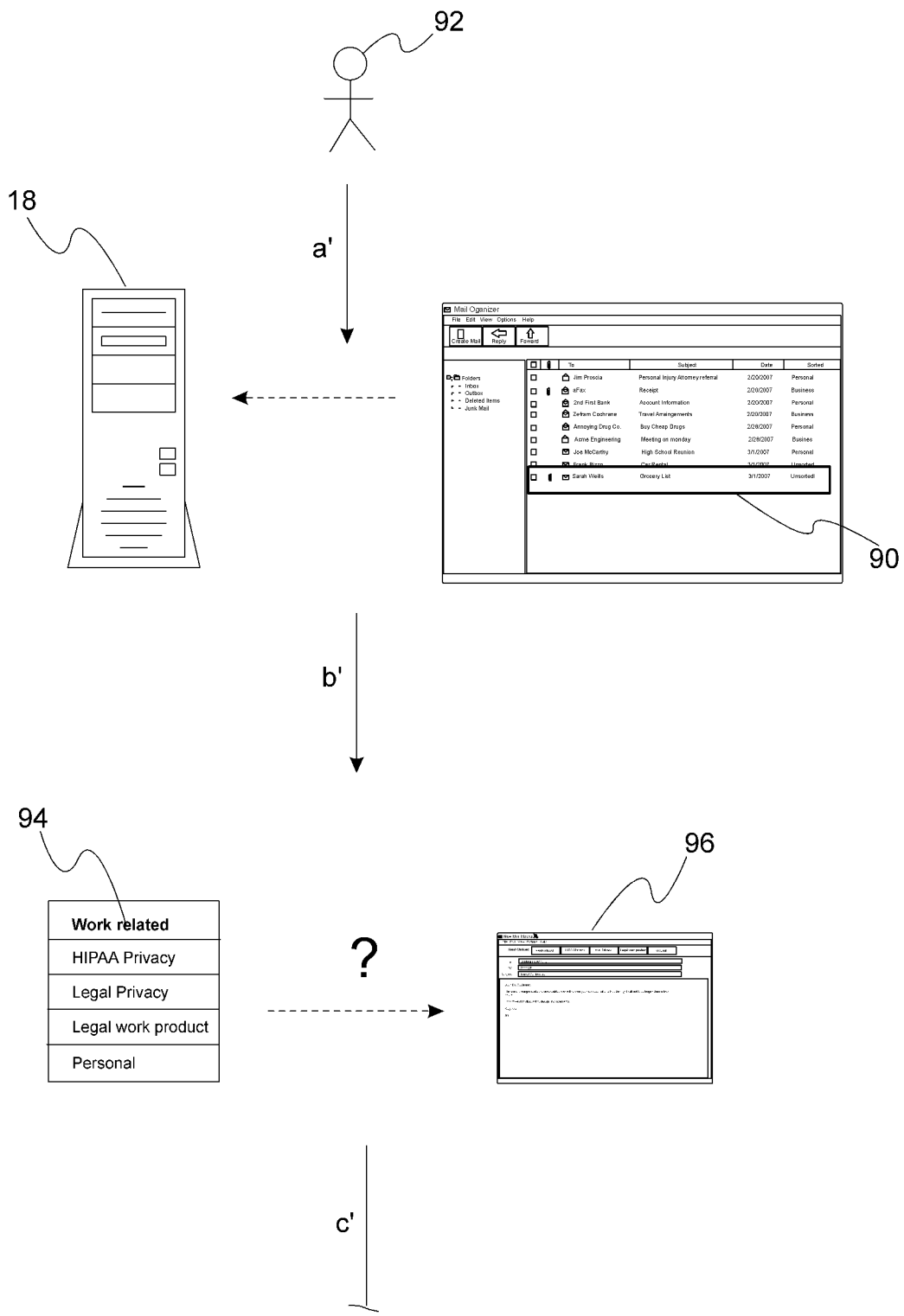
FIGS. 6A and 6B provide a flowchart depicting a method of categorizing email messages received by a user.
Figure 6B:
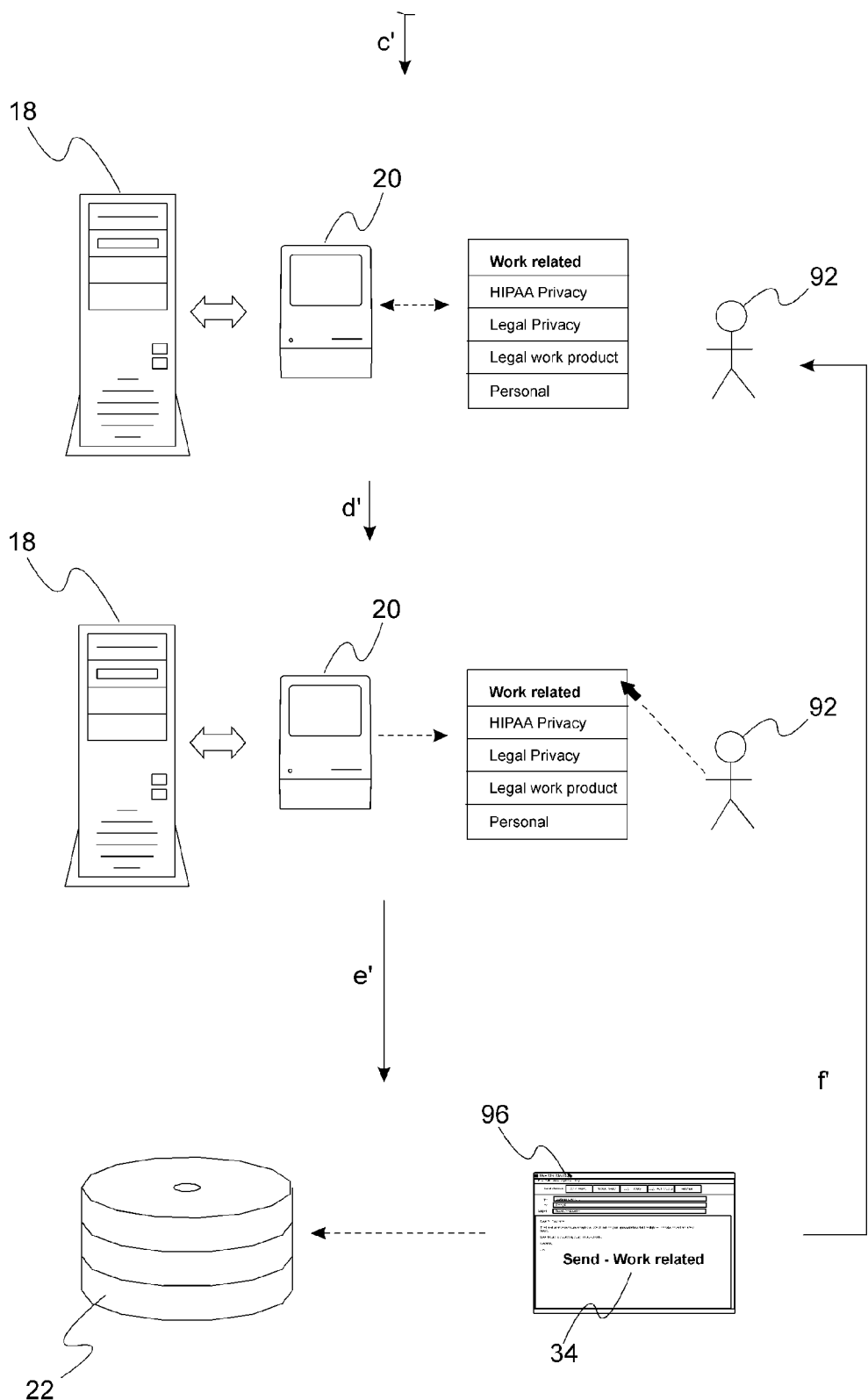

In another embodiment of the present invention, email management system 10 is further operable to categorize email messages received by a user. FIGS. 6A and 6B provide a flowchart depicting the present embodiment. Email server 18 receives user selection 90 from user 92 to open an email message from an email sender in step a'). In step b'), a determination is optionally made if the electronic message from an electronic mail sender has an associated classification category 94. In step c'), user 92 is presented with a plurality of predetermined categories 96 for classifying email message 94. Email message 96 is presented to user 92 for viewing either before the presentation of plurality of predetermined categories 96 or after said presentation. In one refinement, plurality of predetermined categories 96 are presented in association with a "Close" command. Category selection 100 is received by email server 18 from user 92 in step d'). In step e'), email message 94 is stored in a manner dependent upon the selected category. In a refinement of this embodiment, plurality of predetermined categories 96 are presented to user 92 after user 92 acts to close email message 94. Step f' illustrates a variation in which a categorized and saved email message may be re-categorized later if desired.

In a variation of the present embodiment, user 92 is restricted from opening email message 96 unless category selection 100 is provided. In another variation, user 92 is provided with email message 96 after a predetermined period of time if user 92 has failed to provide the second user selection. Alternatively, a default classification may be provided if user 92 opts not to provide category selection 100. Moreover, statistics regarding user compliance in making category selections as well as, statistics regarding the specific categories, are optionally assembled.

Figure 7:
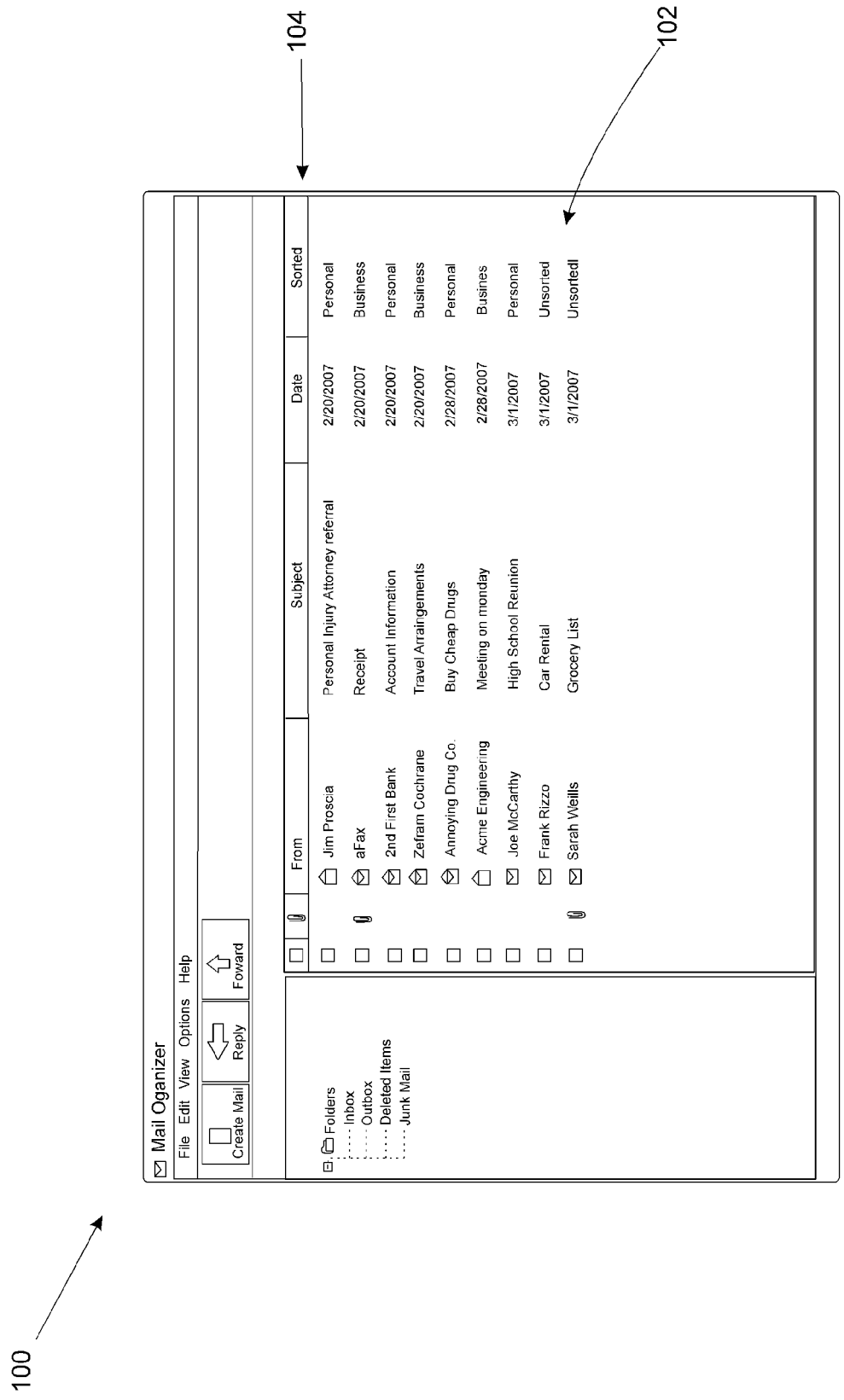
FIG. 7 is an illustration of an interface presented to a user for selecting email messages during the implementation of the method of FIGS. 6A and 6B.

With reference to FIG. 7, an illustration of an interface presented to a user for selecting email messages to open is provided. Email interface 100 is useful in providing user 92 the ability to open messages as set forth in connection with step a') of FIG. 6A. Email interface 100 provides a listing 102 of email messages that may be opened by user 92. Such messages are displayed via variation criteria 104 that are useful for organizing the presentation to user 92. The specific example of FIG. 7 shows criteria 104 as including the sender, the subject, and the date of the email messages. In the present variation, criteria 104 also include a listing of the categorization information described above. This information is labeled as "Sorted." Indication is provided if an email message has not been categorized by the methods of the invention.

The methods of FIGS. 2 and 3 are encoded onto a computer readable medium that is accessible to one or both of email server 18 or user computers 20. Email server 18 or user computers 20 are configured to execute one or more steps of these methods. Useful computer readable media may be volatile or non-volatile. Examples include, but are not limited to, RAM, hard drives, magnetic tape drives, CD-ROM, DVD, optical drives, and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An electronic mail management system for categorizing electronic mail message communication, the electronic mail management system comprising a computer, the computer executing steps of:

receiving electronic mail message components from an electronic mail sender, the electronic mail components including an identification of a recipient on a graphical user interface when composing an electronic mail message to be sent to the recipient;
presenting a plurality of predetermined categories for classifying electronic mail messages to the electronic mail sender in the graphical user interface;
receiving a first user selection from the predetermined categories for classifying the electronic mail messages;
determining when the recipient is a member of a predetermined class of recipients;
sending the electronic mail message to the recipient unless the first user selection is a category identified to be prevented from transmitting electronic mail messages, the first user selection being embedded in the graphical user interface when the recipient is a member of the predetermined class of recipients otherwise the electronic mail is sent without the first user selection embedded therein;
restricting the electronic mail message when the electronic mail message is identified in an attorney-client privileged category in at least one of the following ways: by preventing the electronic mail message being sent outside of a company; preventing the electronic mail message being forwarded to any user; and preventing the electronic mail message being replied to in a "reply to all" manner;
storing the electronic mail message in a predetermined category;
wherein the predetermined categories for classifying electronic mail messages are associated with a send command or send button or a save command or a save button that is operable by the electronic mail sender for sending and saving the electronic message;
wherein the send button is divided into two or more distinct button subsections, each subsections being associated with the predetermined categorizes;
wherein an email management server checks exchange of messages to determine whether the recipient is compliant with categorization of electronic messages such that when the recipient is not compliant with the categorization of electronic messages, notifying the electronic mail sender or the recipient indicating denial of communication of the electronic message; and
collecting statistics regarding user compliance with comparison to each of the predetermined categories for classifying electronic mail messages in the graphical user interface.

2. The electronic mail management system of claim 1 further comprising retaining the electronic mail message for a predetermined time period associated with the first selection.

3. The electronic mail management system of claim 1 wherein each category has an associated non-transitory computer readable identifying code for computer implementation of activities associated with the first selection.

4. The electronic mail management system of claim 1 wherein the plurality of predetermined categories include a "work related" category and one or more non-personal categories.

5. The electronic mail management system of claim 1 wherein the computer further executes steps of:
categorizing received electronic mail messages by the recipient by determining when the electronic message from the electronic mail sender has an associated classification category;
presenting the plurality of predetermined categories to the recipient when the recipient accesses the electronic message from the electronic mail sender in association with a close command in the graphical user interface;
receiving a second user selection from the predetermined categories within the graphic user interface;
storing electronic mail messages in the predetermined category according to the second user selection;
providing the electronic mail from the electronic mail sender to the recipient; and
automatically deleting electronic message after they have been read by the recipient and automatically removing the electric mail message from a deleted folder and from a recycle bin.

6. The electronic mail management system of claim 5 wherein the computer further executes a step of providing the electronic mail message from the electronic mail sender after a predetermined period of time when the user has failed to provide the second user selection.

7. The electronic mail management system of claim 5 wherein the computer further executes a step of requesting the second user selection after the electronic mail message from the electronic mail sender is provided to the recipient.

8. The electronic mail management system of claim 5 wherein the send button or the save button is associated with one or more pop-up or pull-down menus for presenting the plurality of predetermined categories to the recipient.

9. The electronic mail management system of claim 5 wherein categorization of an electronic mail message limits functionality or storage of the email after the electronic mail message is drafted, saved, sent, or received.

10. The electronic mail management system of claim 5 wherein the sender automatically receives a copy of every message that was forwarded by the recipient.

11. The electronic mail management system of claim 5 further comprising using searching technologies to find documents responsive to document requests.

12. A method for categorizing electronic mail message communication, the method comprising:
receiving electronic mail message components from an electronic mail sender on a computing device, the electronic mail message components including an identification of a recipient on a graphical user interface when composing the electronic mail message to be sent to the recipient;
presenting a plurality of predetermined categories for classifying the electronic message to the sender in the graphical user interface;
receiving a first user selection from the predetermined categories;
determining when the recipient is a member of a predetermined class of recipients;
sending the electronic mail to the recipient unless the first user selection is a category identified to be prevented from transmitting electronic messages, the first user selection being embedded in the graphical user interface therein when the recipient is a member of the predetermined class of recipients otherwise the electronic mail is sent without the first user selection embedded therein;
restricting the electronic mail message when the electronic mail message is identified in an attorney-client privileged category in at least one of the following ways: by preventing the electronic mail message being sent outside of a company; preventing the electronic mail message being forwarded to any user; and preventing the electronic mail message being replied to in a "reply to all" manner;
storing the electronic mail message in a predetermined category;

wherein the predetermined categories for classifying electronic mail messages are associated with a send command or send button or a save command or a save button that is operable by the electronic mail sender for sending and saving the electronic message; wherein the send button is divided into two or more distinct button subsections, each subsections being associated with the predetermined categorizes;

wherein an email management server checks exchange of messages to determine whether the recipient is compliant with categorization of electronic messages such that when the recipient is not compliant with the categorization of electronic messages, notifying the electronic mail sender or the recipient indicating denial of communication of the electronic message; and collecting statistics regarding user compliance with comparison to each of the predetermined categories for classifying electronic mail messages in the graphical user interface.

13. The method of claim 12 wherein each category has an associated non-transitory computer readable identifying code for computer implementation of activities associated with the user selection.

14. The method of claim 12 wherein the plurality of the predetermined categories include a "work related" category and one or more non-personal categories.

15. The method of claim 12 further comprising:
categorizing received electronic mail messages by the recipient by determining when the electronic message from the electronic mail sender has an associated classification category;
presenting the plurality of predetermined categories to the recipient when the recipient accesses the electronic message from the electronic mail sender in association with a close command in the graphical user interface;
receiving a second user selection from the predetermined categories within the graphic user interface;
storing electronic mail messages in the predetermined category according to user selection;
providing the electronic mail from the electronic mail sender to the user the recipient; and
automatically deleting electronic message after they have been read by the recipient and automatically removing the electric mail message from a deleted folder and from a recycle bin.

16. The method of claim 12 wherein the send button or the save button is associated with one or more pop-up or pull-down menus for presenting the plurality of predetermined categories to the sender.

17. The method of claim 16 further comprising collecting statistics regarding user selections.

18. The method of claim 12, are repeated periodically and at plurality of times.

19. The method of claim 18 further comprising sorting a plurality of electronic mail messages by user selected categories.

20. The method of claim 18 further comprising retaining the electronic mail message for a predetermined time period associated with the user selection.

21. A non-transitory computer readable medium comprising instructions encoded therein that are accessed by a computer to execute a method, the method comprising:
a) receiving electronic mail message components from an electronic mail sender, the electronic mail components including an identification of a recipient on a graphical user interface when composing the electronic mail message to be sent to the user;
b) presenting a plurality of predetermined categories for classifying the electronic message to the electronic mail sender in the graphical user interface;
c) receiving a user selection from the predetermined categories;
d) determining when the recipient is a member of a predetermined class of recipients;
e) sending the electronic mail message to the recipient, the user selection being embedded therein if the recipient is a member of the predetermined class of recipients otherwise the electronic mail is sent without the selection embedded therein;
f) restricting the electronic mail message when the electronic mail message is identified in an attorney-client privileged category in at least one of the following ways: by preventing the electronic mail message being sent outside of a company; preventing the electronic mail message being forwarded to any user; and preventing the electronic mail message being replied to in a "reply to all" manner;
storing the electronic mail message in a predetermined category;
wherein the predetermined categories for classifying electronic mail messages are associated with a send command or send button or a save command or a save button that is operable by the electronic mail sender for sending and saving the electronic message; wherein the send button is divided into two or more distinct button subsections, each subsections being associated with the predetermined categorizes;
wherein an email management server checks exchange of messages to determine whether the recipient is compliant with categorization of electronic messages such that when the recipient is not compliant with the categorization of electronic messages, notifying the electronic mail sender or the recipient indicating denial of communication of the electronic message; and
collecting statistics regarding user compliance with comparison to each of the predetermined categories for classifying electronic mail messages in the graphical user interface.

* * * * *

UNITED STATES PATENT AND TRADEMARK OFFICE
CERTIFICATE OF CORRECTION

| | |
|---|---|
| PATENT NO. | : 8,635,285 B2 |
| APPLICATION NO. | : 11/963790 |
| DATED | : January 21, 2014 |
| INVENTOR(S) | : Paul D'Amato et al. |

It is certified that error appears in the above-identified patent and that said Letters Patent is hereby corrected as shown below:

In the Claims

Column 7, Line 34, Claim 1:

After "each" delete "subsections" and
Insert -- subsection --

Column 7, Line 35, Claim 1:

After "predetermined" delete "categorizes" and
Insert -- categories --

Column 8, Line 9, Claim 5:

After "deleting electronic" delete "message" and
Insert -- messages --

Column 8, Line 11, Claim 5:

After "removing the" delete "electric" and
Insert -- electronic --

Column 9, Line 7, Claim 12:

After "each" delete "subsections" and
Insert -- subsection --

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,635,285 B2

Column 7, Line 8, Claim 12:

After "determined" delete "categorizes" and
Insert -- categories --

Column 9, Line 42, Claim 15:

After "electronic" delete "message" and
Insert -- messages --

Column 10, Line 40, Claim 21:

After "each" delete "subsections" and
Insert -- subsection --

Column 10, Line 41, Claim 21:

After "predetermined" delete "categorizes" and
Insert -- categories --